(12) United States Patent
Ootao et al.

(10) Patent No.: US 8,913,250 B2
(45) Date of Patent: Dec. 16, 2014

(54) GRAZING INCIDENCE INTERFEROMETER

(75) Inventors: Reiya Ootao, Tsukuba (JP); Yutaka Kuriyama, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 291 days.

(21) Appl. No.: 13/525,748

(22) Filed: Jun. 18, 2012

(65) Prior Publication Data

US 2012/0327425 A1 Dec. 27, 2012

(30) Foreign Application Priority Data

Jun. 24, 2011 (JP) ................. 2011-140822

(51) Int. Cl.
  *G01B 11/02* (2006.01)
  *G01B 9/02* (2006.01)
  *G01B 11/24* (2006.01)
(52) U.S. Cl.
  CPC ........ *G01B 9/02022* (2013.01); *G01B 11/2441* (2013.01); *G01B 9/02076* (2013.01); *G01B 9/02071* (2013.01); *G01B 9/02061* (2013.01); *G01B 2290/60* (2013.01)
  USPC ...................................................... 356/512
(58) Field of Classification Search
  CPC ........... G01B 9/02022; G01B 9/02027; G01B 9/0207
  USPC ...................................................... 356/512
  See application file for complete search history.

(56) References Cited

U.S. PATENT DOCUMENTS

| 5,369,488 A | 11/1994 | Morokuma |
| 5,748,317 A * | 5/1998 | Maris et al. ............ 356/502 |
| 5,818,588 A * | 10/1998 | Matsumoto et al. .......... 356/487 |
| 5,953,125 A * | 9/1999 | de Groot .................. 356/492 |
| 6,008,901 A | 12/1999 | Ohtsuka |
| 2010/0027028 A1 * | 2/2010 | Kuriyama et al. ............ 356/495 |

FOREIGN PATENT DOCUMENTS

| EP | 2 149 777 A2 | 2/2010 |
| JP | A-2000-88551 | 3/2000 |
| JP | A-2010-32342 | 2/2010 |

OTHER PUBLICATIONS

Extended Search Report issued in European Patent Application No. 12173416.4 dated May 16, 2013.

* cited by examiner

*Primary Examiner* — Tarifur Chowdhury
*Assistant Examiner* — Jonathon Cook
(74) *Attorney, Agent, or Firm* — Oliff PLC

(57) ABSTRACT

A grazing incidence interferometer includes a light source, a light beam divider configured to divide original light coming from the light source, an illuminator configured to apply measurement light to a measurement subject, a light beam combining module configured to combine the measurement light reflected from the measurement subject with reference light, and a photodetector configure to detect a combined light beam. The grazing incidence interferometer includes an interferometer main body, a stage configured to hold the measurement subject, a moving mechanism capable of moving the interferometer main body along the measurement subject, and an auxiliary reflector disposed on an extension of an axis of movement of the interferometer main body, an auxiliary light beam separator configured to separate auxiliary light from the original light and to apply the auxiliary light to the auxiliary reflector, and an auxiliary photodetector configured to detect the auxiliary light reflected by the auxiliary reflector.

5 Claims, 7 Drawing Sheets

GRAZING INCIDENCE INTERFEROMETER

CROSS-REFERENCE TO RELATED APPLICATION(S)

The present application claims the benefit of priority of Japanese Patent Application No. 2011-140822, filed on Jun. 24, 2011. The disclosures of this application are incorporated herein by reference.

BACKGROUND

1. Technical Field

The present invention relates to a grazing incidence interferometer.

2. Related Art

Various interferometers for measuring a surface texture of a workpiece are known, and normal incidence interferometers are commonly used for this purpose. Whereas normal incidence interferometers can perform high accuracy measurement using the wavelength of light as a reference, they cannot measure a texture of a measurement subject having a discontinuous step whose height is larger than half of the wavelength or a large undulation that produces an image having a height variation that is larger than half of the wavelength between adjoining pixels.

Grazing incidence interferometers are known as interferometers capable of measuring large undulations that cannot be measured by normal incidence interferometers (refer to Patent document 1).

In grazing incidence interferometers, the apparent wavelength can be increased by applying light obliquely and using resulting reflection light, whereby wavefront variations with respect to an undulation of a measurement subject can be reduced intentionally. Furthermore, since reflection light directions are equalized because of grazing incidence of measurement light, clear interference fringes as would be obtained with a glossy surface can be obtained even with a rough surface.

In grazing incidence interferometers, in general, the distance representing an optical path difference of one wavelength is called fringe sensitivity and defined as a height difference per interference fringe $\Lambda = \lambda/2 \cos\theta$ (μm) where $\lambda$ is the wavelength of measurement light and $\theta$ is the incident angle.

The fringe sensitivity is determined by the incident angle of measurement light and the wavelength of a laser (light source). For example, where the laser wavelength is fixed, the fringe sensitivity is determined only by the incident angle. Therefore, the incident angle is set taking surface properties and condition of a measurement subject and required measurement accuracy into consideration.

Surfaces having such a relatively large undulation that measurement by normal incidence interferometers is difficult (mentioned above) and rough surfaces (non-specular surfaces) are assumed as measurement subjects of grazing incidence interferometers. Typical measurement subjects are various wafers and glasses for FPDs (flat panel displays).

In FPD glasses etc., to attain high accuracy, flatness management which is performed before polishing is important. In this respect, high-accuracy flatness measurement using a grazing incidence interferometer is counted on very much. In recent years, the sizes of FPDs have increased because of their application to large-screen TV receivers and hence the needs of flatness management of large, high-accuracy non-specular surfaces as measurement subjects have been increasing.

To widen the measurement ranges of grazing incidence interferometers to satisfy the requirement of size increase of measurement subjects, the following measures are now being studied.

First, the measurement area of a grazing incidence interferometer can be widened by increasing the incident angle of measurement light.

If the incident angle of a grazing incidence interferometer is increased, the illumination area of a measurement subject surface becomes an elliptical area that is longer than the diameters of a laser light beam in the direction corresponding to the incident direction and the measurement area is widened accordingly. However, the measurement resolution lowers as the measurement area is widened. Therefore, this method may be unfavorable for required measurement accuracy.

Second, a texture of the entire measurement surface of a measurement subject can be measured through calculation by dividing the measurement surface into plural sections, measuring the individual sections successively while moving an interferometer, and connecting measurement results of the respective sections together after completion of the measurement operation.

Such a scanning measurement method was proposed for a normal incidence interferometer (refer to Patent document 2). In the method disclosed in this document, a specular surface of a measurement subject is measured by a normal incidence interferometer and the posture of the normal incidence interferometer is recognized correctly using another interferometer, whereby high accuracy of the connections between measurement results of respective sections is secured.

Applying this scanning measurement method to grazing incidence interferometer enables wide-range measurement while maintaining the height resolution of the grazing incidence interferometer.

[Patent document 1] JP-A-2010-32342

[Patent document 2] JP-A-2000-88551

The above-described method of increasing the incident angle of measurement light of a grazing incidence interferometer to widen its measurement range is not suitable for the increasing of accuracy because of reduction in resolution. In addition, the measurement range increase that is attained by increasing the incident angle is restricted.

On the other hand, the scanning measurement method using a grazing incidence interferometer can widen the measurement range to a large extent by connecting measurement results of respective measurement sections together.

However, to perform such a scanning measurement, it is necessary to support a grazing incidence interferometer for measuring the surface of a measurement subject on a moving mechanism and to prepare another interferometer for measuring the posture of the grazing incidence interferometer. An interferometer needs to be provided with a series of devices such as a laser oscillator, optical paths, and photodetectors. The use of another interferometer causes doubling of these devices, which necessarily complicates the configuration, maintenance work, etc., increases the cost, and causes other problems.

SUMMARY

One or more exemplary embodiments of the present invention provide a grazing incidence interferometer which can widen the measurement range while simplifying the measuring instrument.

A first aspect of the invention is to simplify the measuring instrument by employing a scanning measurement method with a grazing incidence interferometer to widen the measurement range and using elements of an optical system for measuring the surface of a measurement subject also as elements of an optical system for measuring the posture of the scanning measurement grazing incidence interferometer.

The grazing incidence interferometer according to an exemplary embodiment of the invention comprises:

an interferometer main body having
- a light source configured to generate coherent original light,
- a light beam divider configured to divide the original light coming from the light source into measurement light and reference light,
- an illuminator configured to apply the measurement light obliquely to a measurement subject surface of a measurement subject,
- a light beam combining module configured to combine the measurement light reflected from the measurement subject surface with the reference light, and
- a photodetector configure to detect a combined light beam produced by the light beam combining module;

a stage configured to hold the measurement subject;
a moving mechanism mounted on the stage, and configured to support the interferometer main body and to be capable of moving the interferometer main body along the measurement subject; and
an auxiliary reflector fixed to the stage and disposed on an extension of an axis of movement of the interferometer main body by the moving mechanism,
wherein the interferometer main body has
- an auxiliary light beam separator configured to separate auxiliary light from the original light coming from the light source and to apply the separated auxiliary light to the auxiliary reflector, and
- an auxiliary photodetector configured to detect the auxiliary light reflected by the auxiliary reflector.

In this grazing incidence interferometer, elements of an existing grazing incidence interferometer can be used as appropriate as the light source, the light beam divider, the illuminator, the light beam combining module, and the photodetector which are provided in the interferometer main body.

A measuring module for performing image processing is used in measuring a texture of a measurement subject on the basis of interference fringes occurring in an image of a light beam detected by the photodetector. The measuring module may be a one used in an existing grazing incidence interferometer, such as an externally connected personal computer. The measuring module may be either provided outside or incorporated in the interferometer main body.

In this grazing incidence interferometer, a surface texture of a measurement subject surface, that is, a prescribed surface area of a measurement subject mounted on the stage, can be measured by means of the light source, the light beam divider, the illuminator, the light beam combining module, and the photodetector (measurement optical system) which are provided in the interferometer main body.

The range of a measurement area that can be measured at one time by the measurement optical system (the light source to the photodetector) provided in the interferometer main body is restricted. Therefore, when the measurement subject surface is large, it is divided into plural sections and a scanning measurement is performed. The entire measurement subject surface is covered by moving the interferometer main body successively to those sections by the moving mechanism and connecting measurement results of the respective sections together.

To perform a scanning measurement, information indicating a position of the interferometer main body with respect to the stage is acquired from a control system of the moving mechanism which moves the interferometer main body. Furthermore, a change in the posture (e.g., inclination) of the interferometer main body with respect to the stage is detected with high accuracy by measuring the state of auxiliary light reflected from the auxiliary reflector with an auxiliary optical system which includes the auxiliary light beam separator and the auxiliary photodetector which are provided in the interferometer main body. The above-mentioned position information of the interferometer main body is corrected using the thus-detected position change of the interferometer main body to obtain highly accurate position information. The accuracy of connections of measurement results of the plural sections is increased using such pieces of highly accurate position information, whereby a high-accuracy scanning measurement can be realized.

The light source of the measurement optical system can also be used by the auxiliary optical system for detecting a posture of the interferometer main body, and elements (the light beam divider to the photodetector) of the measurement optical system can also be used by the auxiliary photodetector. The instrument can thus be simplified.

The auxiliary photodetector may comprise a lens configured to focus the auxiliary light coming from the auxiliary reflector and a planar photodetector disposed at a focal position of the lens.

In this configuration, auxiliary light reflected from the auxiliary reflector passes through the lens and is focused on the surface of the planar photodetector. Since the focusing position on the planar photodetector indicates a posture change of the interferometer main body (with respect to the auxiliary reflector, that is, the stage), a posture of the interferometer main body can be measured on the basis of the detection position on the planar photodetector.

The auxiliary photodetector may comprise a half mirror so as to be located on an optical path between the auxiliary light beam separator and the auxiliary reflector, and a planar photodetector configured to detect a combined light beam of auxiliary light coming from the auxiliary reflector and light reflected from the half mirror.

In this configuration, part of auxiliary light coming from the auxiliary light beam separator is reflected by the half mirror and supplied to the planar photodetector, and the other part passes through the half mirror, is reflected by the auxiliary reflector, again passes through the half mirror, and is finally supplied to the planar photodetector. The planar photodetector detects a combined light beam of the above two reflection light beams, and the combined light beam reflects a difference caused by the optical path between the half mirror and the auxiliary reflector, in particular, it produces interference fringes corresponding to a posture change of the interferometer main body (with respect to the stage). Therefore, a posture of the interferometer main body can be measured on the basis of interference fringes in an image obtained by the planar photodetector.

The auxiliary photodetector may comprise an auxiliary light beam combining module configured to combine the auxiliary light coming from the auxiliary reflector and the original light coming from the light source and to supply a combined light beam to the light beam divider, and an auxiliary mask disposed on an optical path of the auxiliary light that goes from the auxiliary light beam separator to the auxiliary light beam combining module past the auxiliary reflector and configured to transmit only part, located in an auxiliary light region, of the auxiliary light.

One of the light beam divider, the illuminator, and the light beam combining module may have a measurement mask disposed in an optical path of the measurement light and configured to transmit only part, located in a prescribed measurement light region, of the measurement light.

The auxiliary light region of the auxiliary mask and the measurement light region of the measurement mask may be set so as not to overlap with each other.

In this configuration, since the auxiliary light beam combining module combines auxiliary light coming from the auxiliary reflector with original light coming from the light source and supplies a combined light beam to the light beam divider, the photodetecting function of the auxiliary optical system and that of the measurement optical system can be integrated together.

More specifically, the auxiliary light portion of the combined light beam is supplied from the light beam divider to the photodetector via the light beam combining module, and a posture of the interferometer main body is measured on the basis of interference fringes of the auxiliary light portion of the combined light beam and a corresponding portion of the original light. On the other hand, part of the original light portion of the combined light beam is separated by the light beam divider to serve as reference light and supplied to the light beam combining module as it is, the remaining part is supplied to the illuminator and the measurement subject surface as measurement light. A texture of the measurement subject surface is measured on the basis of interference fringes of the measurement light and the reference light.

The auxiliary mask and the measurement mask are used to allow auxiliary light and original light for the auxiliary optical system and measurement light and reference light for the measurement optical system to travel independently in the optical paths downstream of the auxiliary light beam combining module.

More specifically, the auxiliary mask is formed so as to transmit only part, located in the particular auxiliary light region of the beam cross section, of the original light, and thereby cuts the auxiliary light to only a part located in the auxiliary light region before being combined with the original light by the auxiliary light beam combining module. Therefore, a combined light beams of the auxiliary light of the auxiliary optical system and the corresponding portion of the original light travels exclusively through the part, corresponding to the auxiliary light region, of the optical path downstream of the auxiliary light beam combining module.

On the other hand, the measurement mask is formed so as to transmit only part, located in the measurement light region which is the other region of the beam cross section, of the original light, and thereby cuts the measurement light to only a part located in the measurement light region at a position downstream of the light beam divider. Therefore, a combined light beams of the measurement light of the measurement optical system and the corresponding portion of the reference light travel exclusively through the part, corresponding to the measurement light region, of the optical path downstream of the light beam combining module.

As a result, the part, located in the measurement light region, of a light beam that is detected by the photodetector after being produced by the light beam combining module enables measurement of a texture of the measurement subject surface on the basis of interference fringes of the reference light and the corresponding portion of the measurement light. And the part, located in the auxiliary light region, of the same light beam enables detection of a posture of the interferometer main body on the basis of interference fringes of the auxiliary light and the corresponding portion of the original light.

A texture of the measurement subject surface can be measured using part, located in the measurement light region, of a received light beam and a posture of the interferometer main body can be measured using the other part, located in the auxiliary light region, of the received light beam by registering the measurement light region of the measurement mask and the auxiliary light region of the auxiliary mask in the external measuring module in advance. This makes it possible to further increase the degree of sharing of elements of the instrument.

The measurement light region may be an inside region of a beam of the measurement light and the auxiliary light region may be a ring-shaped region located outside the measurement light region.

In this configuration, since the measurement light region and the auxiliary light region are arranged in a concentric manner, each of them is point-symmetrical and does not cause any directivity-related restrictions. Since each of the measurement light region and the auxiliary light region is a solid region, interference fringes can be detected reliably. In particular, where the measurement light region is set inside, it is given a large area and hence a texture of the measurement subject surface can be measured with sufficiently high accuracy.

Where the measurement light region and the auxiliary light region are arranged in a concentric manner, they may be a circle and a circular-ring-shaped region around it, a square and a square-ring-shaped region around it, or a circle and a square-ring-shaped region around it.

DETAILED DESCRIPTION

Embodiment 1

Figure 1:
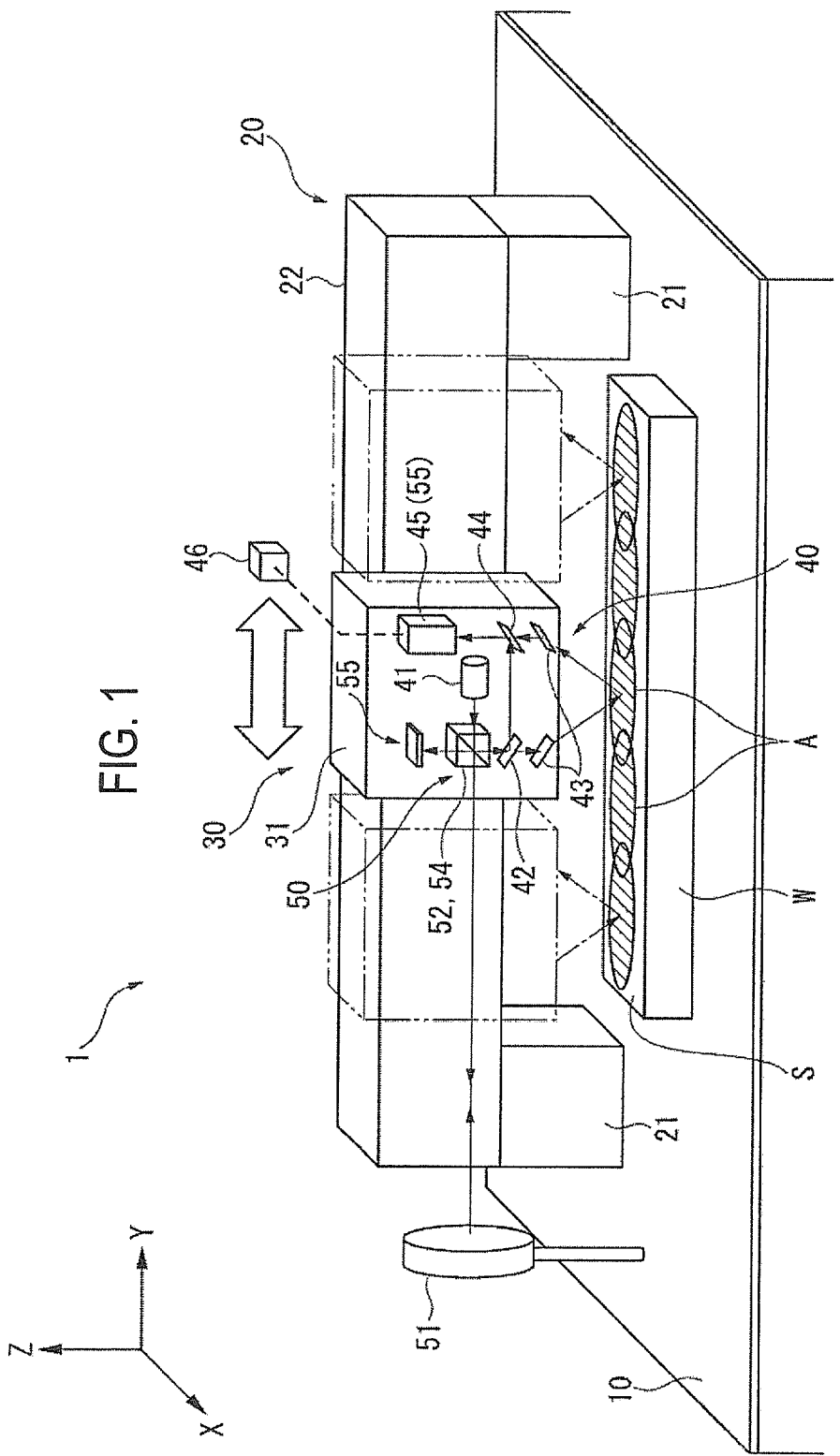
FIG. 1 is a perspective view showing an entire structure according to a first embodiment of the present invention.

FIGS. 1-10 show a first embodiment of the present invention. As shown in FIG. 1, a grazing incidence interferometer 1 is equipped with a stage 10 which holds a measurement subject W, a moving mechanism 20 which is mounted on the stage 10, and an interferometer main body 30 which is supported by the moving mechanism 20. The stage 10 is similar to a surface plate used in a three-dimensional coordinate measuring machine etc., and its top surface is an accurate horizontal surface.

The moving mechanism 20 has a pair of columns 21 which are erected from the top surface of the stage 10, a beam 22 which bridges the columns 21, and a carriage (not shown) which can move along the beam 22.

The beam 22 incorporates a drive mechanism (not shown) for driving the carriage and an encoder (not shown) for detecting a movement position of the carriage. Therefore, in the moving mechanism 20, the carriage can be moved to an arbitrary position along the beam 22 by means of the drive mechanism and a current position of the carriage with respect to the stage 10 can be acquired correctly by means of the encoder.

The interferometer main body 30 has a case 31 which is supported by the carriage of the moving mechanism 20, and optical elements constituting a measuring optical system 40 and an auxiliary optical system 50 (see FIG. 2) are housed in the case 31.

The measuring optical system 40 has a light source 41, a light beam divider 42, an illuminator 43, a light beam combining module 44, and a photodetector 45. The light source 41 generates coherent original light Lo. The light beam divider 42 divides the original light Lo into measurement light Lm and reference light Lr. The illuminator 43 applies the measurement light Lm to a measurement subject surface S of the measurement subject W obliquely. The light beam combining module 44 combines the measurement light Lm that is reflected from the measurement subject surface S with the reference light Lr coming from the light beam divider 42. The photodetector 45 detects a detection light beam Ld produced by the light beam combining module 44. The above optical elements constituting the measuring optical system 40 will be described later in detail.

Equipped with the above measuring optical system 40, the interferometer main body 30 can measure a texture of the measurement subject surface S of the measurement subject W.

A measurable range of the measurement subject surface S in a state that the interferometer main body 30 is stopped at a prescribed position is a measurement range A (see FIG. 1). Although each measurement range A is smaller than the measurement subject surface S of the measurement subject W, measurement data of the entire measurement subject surface S can be obtained by performing measurements at plural respective positions while moving the interferometer main body 30 to those positions by the moving mechanism 20 and connecting measurement data of the measurement ranges A obtained at the respective positions (scanning measurement).

The auxiliary optical system 50 has an auxiliary reflector 51, an auxiliary light beam separator 52, and an auxiliary photodetector 55. The auxiliary reflector 51 is fixed to the stage 10 and disposed on an extension of the axis of movement of the interferometer main body 30 by the moving mechanism 20. The auxiliary light beam separator 52, which is mounted on the interferometer main body 30, separates auxiliary light La from the original light Lo coming from the light source 41 and causes the separated auxiliary light La to shine on the auxiliary reflector 51. The auxiliary photodetector 55, which is mounted on the interferometer main body 30, detects the auxiliary light La that is reflected from the auxiliary reflector 51.

In the embodiment, the auxiliary photodetector 55 has an auxiliary light beam combining module 54 and an auxiliary mask 59, and the measuring optical system 40 is equipped with a measurement mask 58 which corresponds to the auxiliary mask 59.

The auxiliary light beam combining module 54 combines the auxiliary light La coming from the auxiliary reflector 51 with the original light Lo coming from the light source 41, and supplies combined light to the light beam combining module 44. In the embodiment, as described later in detail, the auxiliary light beam separator 52 also serves as part of the auxiliary light beam combining module 54. The optical elements constituting the auxiliary optical system 50 will be described later in detail.

The auxiliary mask 59 is disposed on the optical path of the auxiliary light La which goes from the auxiliary light beam separator 52 to the auxiliary light beam combining module 54 past the auxiliary reflector 51, and transmits only part, located in a prescribed auxiliary light region Aa, of the auxiliary light La.

The measurement mask 58 is disposed on the optical path of the measurement light Lm which goes from the light beam divider 42 to the light beam combining module 44 through the illuminator 43, and transmits only part, located in a prescribed measurement light region Am, of the measurement light Lm.

Example means for allowing passage of only a particular light beam in each of the auxiliary mask 59 and the measurement mask 58 are disposing, on the optical path, a mask plate that is formed so as to interrupt light that should not be transmitted and forming a mask pattern on the surface of a lens or a mirror in the form of a shield coating or a light scattering surface treatment area.

The auxiliary light region Aa of the auxiliary mask 59 and the measurement light region Am of the measurement mask 58 are set so as not to overlap with each other. Example of such an auxiliary light region Aa and measurement light region Am are concentric sections.

Figure 5:
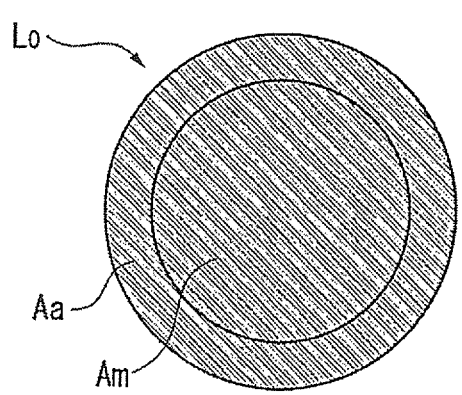
FIG. 5 is a view showing a distribution of original light and reference light according to the first embodiment of the present invention.
Figure 6:
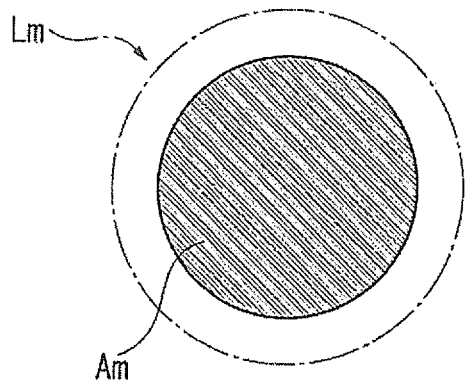
FIG. 6 is a view showing a distribution of measurement light according to the first embodiment of the present invention.
Figure 7:
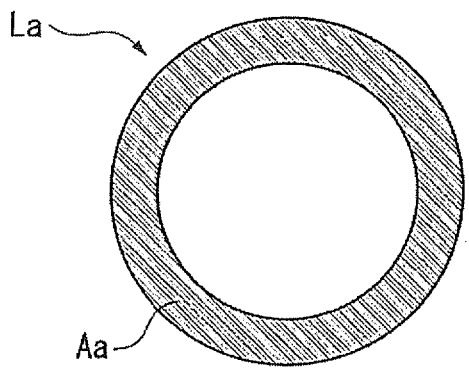
FIG. 7 is a view showing a distribution of auxiliary light according to the first embodiment of the present invention.

As shown in FIG. 5, where the original light Lo is circular, the measurement light region Am and the auxiliary light region Aa may be a small inside circle and an outside circular ring, respectively. The auxiliary mask 59 and the measurement mask 58 corresponding to such concentric auxiliary light region Aa and measurement light region Am may be shield plates having corresponding mask patterns.

Figure 3:
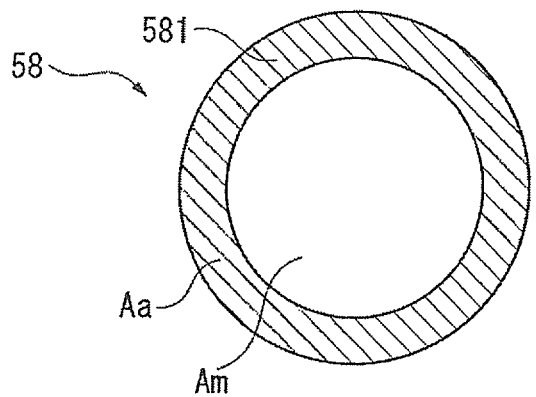
FIG. 3 is a view showing a measurement mask according to the first embodiment of the present invention.

As shown in FIG. 3, the measurement mask 58 may be a shield plate 581 whose shield region is the same as a circular-ring-shaped auxiliary region Aa, in which case a light beam is allowed to pass through only an inside, circular measurement light region Am. If such a measurement mask 58 is disposed on the optical path of the measurement light Ln which goes from the light beam divider 42 to the light beam combining module 44 through the illuminator 43, only a small circular light beam that is part of the measurement light Lm and is located in the measurement light region Am is allowed to pass through the measurement mask 58 (see FIG. 6).

Figure 4:
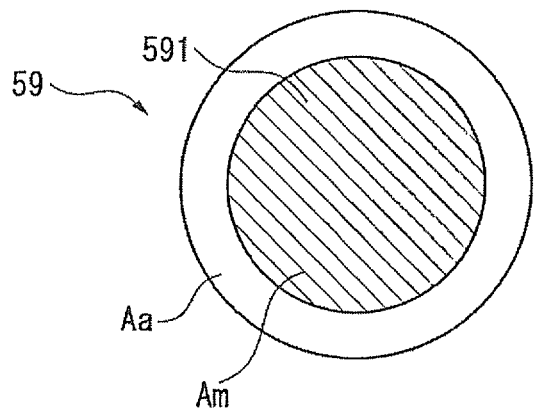
FIG. 4 is a view showing an auxiliary mask according to the first embodiment of the present invention.

As shown in FIG. 4, if a shield plate 591 whose shield region is the same as a small circular measurement region Am is used as the auxiliary mask 59, a light beam is allowed to pass through only an outside auxiliary light region Aa. If such an auxiliary mask 59 is disposed on the optical path of the auxiliary light La which goes from the auxiliary light beam separator 52 to the auxiliary light beam combining module 54 past the auxiliary reflector 51, only a circular-ring-shaped light beam that is part of the auxiliary light La and is located in the auxiliary light region Aa is allowed to pass through the auxiliary mask 59 (see FIG. 7).

Since the above-described auxiliary optical system 50 is provided so as to extend from the interferometer main body 30 to the stage 10, a posture change of the interferometer main body 30 with respect to the stage 10 can be measured with high accuracy. Therefore, in a scamming measurement (described above), measurement data of the plural measurement ranges A can be connected together with even higher accuracy by acquiring basic positions of the interferometer main body 30 from the encoder of the moving mechanism 20 and making corrections taking into consideration posture changes of the interferometer main body 30 with respect to the stage 10 that are measured by the auxiliary optical system 50.

In addition, the instrument configuration can be simplified by using elements of the measuring optical system 40 also as elements of the auxiliary optical system 50.

That part of the elements which are shared by the measuring optical system 40 and the auxiliary optical system 50 in the interferometer main body 30 will be described below in detail.

It is preferable that the light source 41 be a light source such as a He—Ne laser which emits laser light that is highly coherent and whose component ratio between p-polarized light and s-polarized light does not vary in time when the laser light enters the optical system of the grazing incidence interferometer 1.

The original light Lo that is emitted from the light source 41 is converted into parallel light having a larger beam diameter by lenses 411 and 412 and then input to the auxiliary light beam separator 52.

The light source 41 and the auxiliary reflector 51 are opposed to each other on the movement axis of the moving mechanism 20, and a half mirror 521 is disposed on the axis extending from the light source 41 to the auxiliary reflector 51 so as to form an angle 45° with the axis.

The light beam divider 42 and an auxiliary mirror 541 are disposed on the axis that is perpendicular to the axis extending from the light source 41 to the auxiliary reflector 51 and passes through the half mirror 521.

That part of the original light Lo emitted from the light source 41 which is reflected by the surface of the half mirror 521 and thereby bent by 90° is supplied to the light beam divider 42.

On the other hand, that part of the original light Lo which passes through the half mirror 521 goes straight as the auxiliary light La, is reflected by the auxiliary reflector 51, is bent by 90° through reflection by the half mirror 521, is reflected by the auxiliary mirror 541, passes through the half mirror 521, and is finally supplied to the light beam divider 42.

That is, the half mirror 521 serves as the auxiliary light beam separator 52 for separating part of the original light Lo coming from the light source 41 to produce the auxiliary light La.

The half mirror 521 and the auxiliary mirror 541 constitute the auxiliary light beam combining module 54 for combining the auxiliary light La that returns from the auxiliary reflector 51 with the original light Lo and supplying combined light to the light beam divider 42. The light beam divider 42, the light beam combining module 44, and the photodetector 45 which are located downstream of the half mirror 521 also serve as part of the auxiliary photodetector 55.

Since the auxiliary mirror 541 is formed with the above-mentioned auxiliary mask 59, only part, located in the auxiliary light region Aa (see FIG. 7), of the auxiliary light La is reflected by the auxiliary mirror 541 and returns to the half mirror 521.

The auxiliary mask 59 allows only the part, located in the auxiliary light region Aa, of the auxiliary light La to return.

Therefore, in the light beam divider 42, the light beam combining module 44, and the photodetector 45 which also serve as part of the auxiliary photodetector 55, the part, located in the auxiliary light region Aa, of the light beam is used exclusively by the auxiliary optical system 50.

The light beam divider 42, which is a polarizing beam splitter, for example, divides the original light Lo coming from the auxiliary light beam separator 52 into two polarized light beams whose polarization directions are deviated from each other by 90°, and outputs the two polarized light beams as measurement light Lm and reference light Lr.

For example, the polarizing beam splitter is formed by sandwiching a polarizing film which exhibits polarization dependence between two optical glass plates. The polarizing film has such an optical characteristic as to reflect an s-polarized component of parallel light and to transmit its p-polarized component. Therefore, when the original light Lo shines on the polarizing film obliquely, it can be separated into measurement light Lm and reference light Lr whose polarization axes are deviated from each other by 90°.

Alternatively, the light beam divider 42 may be a rectangular parallelepiped polarizing beam splitter which is formed by sandwiching the above-mentioned polarizing film between two right-angle prisms made of optical glass.

Between the two divided light beams, the measurement light Lm is supplied to the illuminator 43, where it shines on the measurement subject surface S. The reflected measurement light Lm is supplied to the light beam combining module 44. The reference light Lr is supplied directly to the light beam combining module 44.

The above-mentioned measurement mask 58 is disposed on the optical path from the light beam divider 42 to the illuminator 43, whereby only part, located in the measurement light region Am (see FIG. 6), of the measurement light Lm coming from the light beam divider 42 is supplied to the illuminator 43.

The measurement mask 58 allows only the part, located in the measurement light region Am, of the measurement light Lm to travel forward. Therefore, in the light beam divider 42, the light beam combining module 44, and the photodetector 45 which also serve as part of the auxiliary photodetector 55, the part, located in the measurement light region Am, of the light beam is used exclusively by the measurement optical system 40.

The illuminator 43 has a first objective mirror 431 and a second objective mirror 432. The first objective mirror 431 is to bend the measurement light Lm coming from the light beam divider 42 so that it shines on the measurement subject surface S at a prescribed angle. The incident angle with respect to the measurement subject surface S is adjusted so as to attain sufficiently high measurement accuracy.

The second objective mirror 432 is to bend the measurement light Lm reflected from the measurement subject surface S so that it shines on the light beam combining module 44. As in the case of the first objective mirror 431, the inclination of the second objective mirror 432 with respect to the measurement subject surface S is adjusted as appropriate.

It is preferable that the first objective mirror 431 and the second objective mirror 432 be the same in setting height and angle, that is, the incidence-side element and the exit-side element be symmetrical with respect to the plane that is perpendicular to the measurement subject surface S.

Like the light beam divider 42, the light beam combining module 44 is a polarizing beam splitter, for example. The light beam combining module 44 combines the measurement light Lm coming from the illuminator 43 with the reference light Lr coming from the light beam divider 42 in such a manner that their optical axes coincide with each other, and supplies a resulting detection light beam Ld to the photodetector 45.

As described above, in the optical path connecting the light beam divider 42, the light beam combining module 44, and the photodetector 45 which also serve as part of the auxiliary photodetector 55, the auxiliary light region Aa corresponds to a path that is dedicated to the auxiliary optical system 50 and the measurement light region Am corresponds to a path that is dedicated to the measuring optical system 40.

For example, the part, located in the auxiliary light region Aa, of the light beam that goes from the half mirror 521 to the light beam divider 42 is a combined light beam consisting of the corresponding part of the original light Lo and the auxiliary light La and the part, located in the measurement light region Am, of the same light beam is formed only by the corresponding part of the original light Lo.

Likewise, the part, located in the auxiliary light region Aa, of the light beam that goes from the light beam divider 42 to the light beam combining module 44 is a combined light beam consisting of the corresponding part of the reference light Lr (produced by converting the original light Lo by the light beam divider 42) and the auxiliary light La and the part, located in the measurement light region Am, of the same light beam is formed only by the corresponding part of the reference light Lr (produced by converting the original light Lo).

On the other hand, in the illuminator 43, the part, located in the auxiliary light region Aa, of the light beam is interrupted by the measurement mask 58 and the part, located in the measurement light region Am, of the same light beam is formed only by the corresponding part of the measurement light Lm (produced by converting the original light Lo) and shines on the measurement subject surface S. The reflected measurement light Lm is supplied to the light beam combining module 44.

The part, located in the auxiliary light region Aa, of the detection light beam Ld that goes from the light beam combining module 44 to the photodetector 45 is a combined light beam consisting of the corresponding part of the reference light Lr and the auxiliary light La and the part, located in the measurement light region Am, of the same light beam is a combined light beam consisting of the corresponding part of the reference light Lr and the measurement light Lm.

Figure 8:
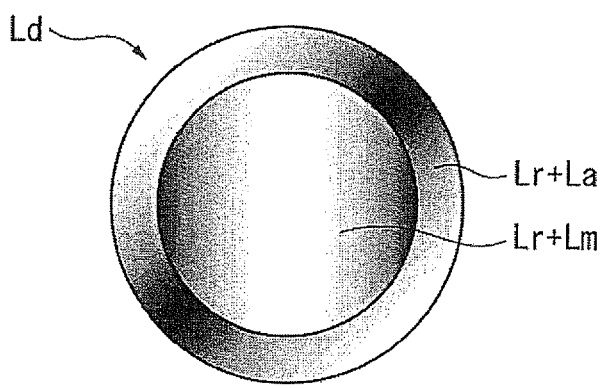
FIG. 8 is a view showing a distribution of detection light beam according to the first embodiment of the present invention.

As described above, the respective parts of each optical path corresponding to the measurement light region Am and the auxiliary light region Aa function as independent optical paths. As a result, as shown in FIG. 8, when detected by the photodetector 45, the detection light beam Ld produces interference fringes of the reference light Lr and the measurement light Lm in the inside measurement light region Am and produces interference fringes of the reference light Lr and the auxiliary light La in the outside auxiliary light region Aa.

The photodetector 45 is equipped with a quarter-wave plate 451, a lens 452, a three-section prism 453, polarizing plates 454A-454C, and imaging devices 455A-455C. The thus-configured photodetector 45 detects, in the form of images, the detection light beam Ld coming from the light beam combining module 44.

Disposed on the incidence side of the three-section prism 453, the quarter-wave plate 451 converts the combined light beam coming from the light beam combining module 44 into circularly polarized light. The three-section prism 453, which is formed by, for example, bonding surfaces of three prisms, divides the combined light into three divisional light beams through reflection and transmission at the prism bonding surfaces.

The polarizing plates 454A-454C and imaging devices 455A-455C are disposed so as to correspond to the three divisional light beams which are output from the three-section prism 453 in different directions. The polarizing plates 454A-454C are disposed in such a manner that their polarization axes extend in different directions. Images of sets of interference fringes whose phases are shifted by different amounts by the respective polarizing plates 454A-454C are taken by the respective imaging devices 455A-455C.

A measuring module 46 using a personal computer or the like is connected to the photodetector 45. The measuring module 46 processes the images of the detection light beam Ld which are obtained by the imaging devices 455A-455C, that is, performs computation processing according to a known phase shift method on the basis of the interference fringe images. Furthermore, the measuring module 46 causes the grazing incidence interferometer 1 to perform a scanning measurement on the plural measurement ranges A of the measurement subject surface S by controlling the moving mechanism 20 and the interferometer main body 30 according to registered operation control programs.

How the grazing incidence interferometer 1 according to the embodiment operates will be described below.

First, the measuring module 46 is activated and the interferometer main body 30 is moved to a first measurement position by the moving mechanism 20. A measurement is performed there on the measurement subject surface S.

Measurement data of a surface texture of one measurement range A of the measurement subject surface S is obtained on the basis of interference fringes of the part, located in the measurement light region Am, of a detection light beam Ld.

Posture data of the interferometer main body 30 corresponding to the current measurement range A is obtained on the basis of interference fringes of the part, located in the reference light region Aa, of the detection light beam Ld.

Then, the interferometer main body 30 is moved to the next measurement position and a measurement is performed there on the measurement subject surface S in the similar manner. This operation is repeated successively.

When all measurements have been completed, measurement data obtained at the respective positions are connected together. In doing so, position data of the respective positions are acquired from the encoder of the moving mechanism 20 and posture data of the interferometer main body 30 that were acquired at the time of the measurements at the respective positions are used.

The above-described embodiment provides the following advantages.

Grazing incidence measurement data of the entire measurement subject surface S is obtained by a scanning measurement in which measurement data of the measurement subject surface S are acquired while the interferometer main body 30 is moved and the acquired measurement data are connected together. This scanning measurement makes it possible to cover the entire measurement subject surface S of even a large measurement subject W. Therefore, in the measuring optical system 40 of the interferometer main body 30, the incident angle with respect to the measurement subject surface S need not be set unduly large to widen each measurement range A. High measurement accuracy can be secured for each measurement range A.

Posture data of the interferometer main body 30 can be acquired with high accuracy by the auxiliary optical system 50 for the purpose of connection of measurement data. Therefore, the accuracy of measurement data of the entire measurement subject surface S can also be made high.

Since many elements of the auxiliary optical system 50 are also used by the measuring optical system 40, the instrument can be simplified whereas the posture of the interferometer main body 30 can be detected with the same high accuracy as in the measurement of the measurement subject surface S.

The auxiliary mask 59 and the measurement mask 58 are used to enable sharing of elements by the auxiliary optical system 50 and the measuring optical system 40. Therefore, the respective parts of each optical path corresponding to the measurement light region Am and the auxiliary light region Aa can function as independent optical paths, whereby the functions of the measuring optical system 40 and the auxiliary optical system 50 can be exercised sufficiently.

Modifications to Embodiment 1

Although in the above-described first embodiment the auxiliary light region Aa is provided around the circular measurement light region Am (the regions Am and Aa are concentric), the arrangement pattern of the measurement light region Am and the auxiliary light region Aa is not limited to it.

Figure 9:
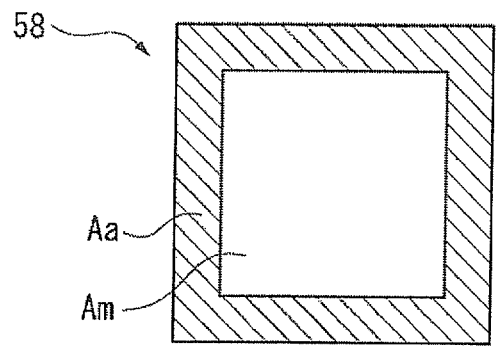
FIG. 9 is a view showing modification of the measurement mask.
Figure 10:
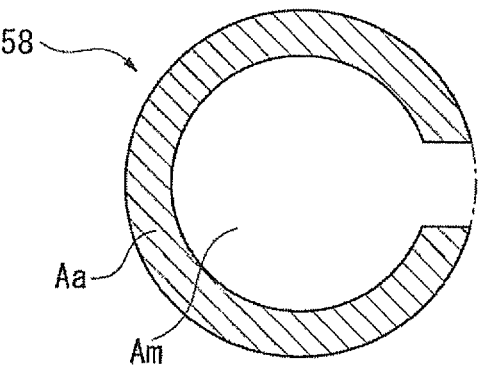
FIG. 10 is a view showing another modification of the measurement mask.

As shown in FIG. 9, an auxiliary light region Aa may be provided around a rectangle (in this embodiment, square) measurement light region Am. As shown in FIG. 10, the outside auxiliary light region Aa need not always have a ring shape and may have a C shape, for example. Even the inside/outside positions of the measurement light region Am and the auxiliary light region Aa may be reversed. Each of the above modified sets of a measurement light region Am and an auxiliary light region Aa can be realized as appropriate by adjusting the shapes/outlines of the measurement mask 58 and the auxiliary mask 59.

Embodiment 2

Figure 11:
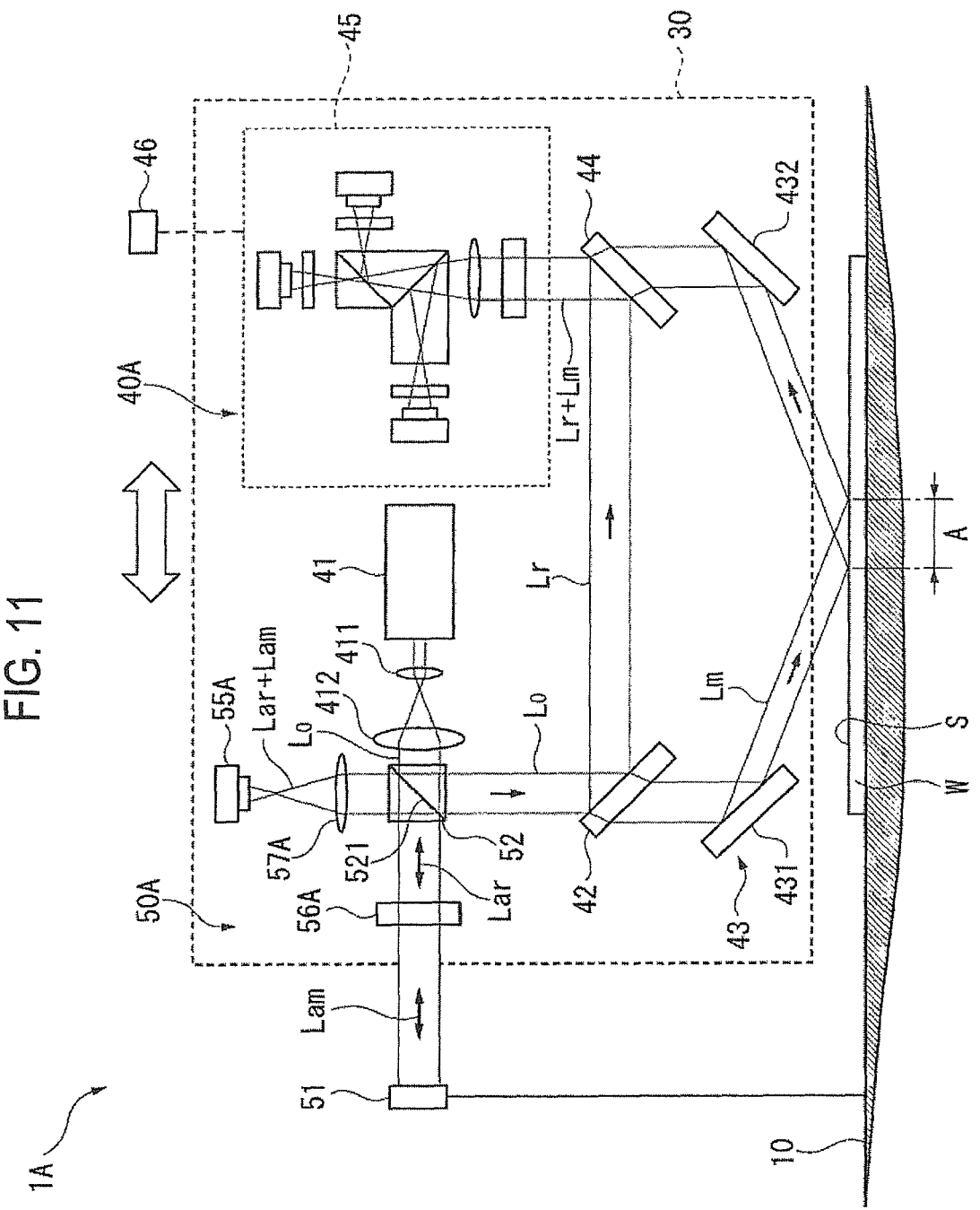
FIG. 11 is a view showing an optical element according to a second embodiment of the present invention.

FIG. 11 shows a second embodiment of the invention. A grazing incidence interferometer 1A according to the second embodiment is the same in basic configuration as the grazing incidence interferometer 1 according to the first embodiment, and hence the stage 10, the moving mechanism 20, and the interferometer main body 30 which are shown in FIG. 1 will not be described below redundantly.

Figure 2:
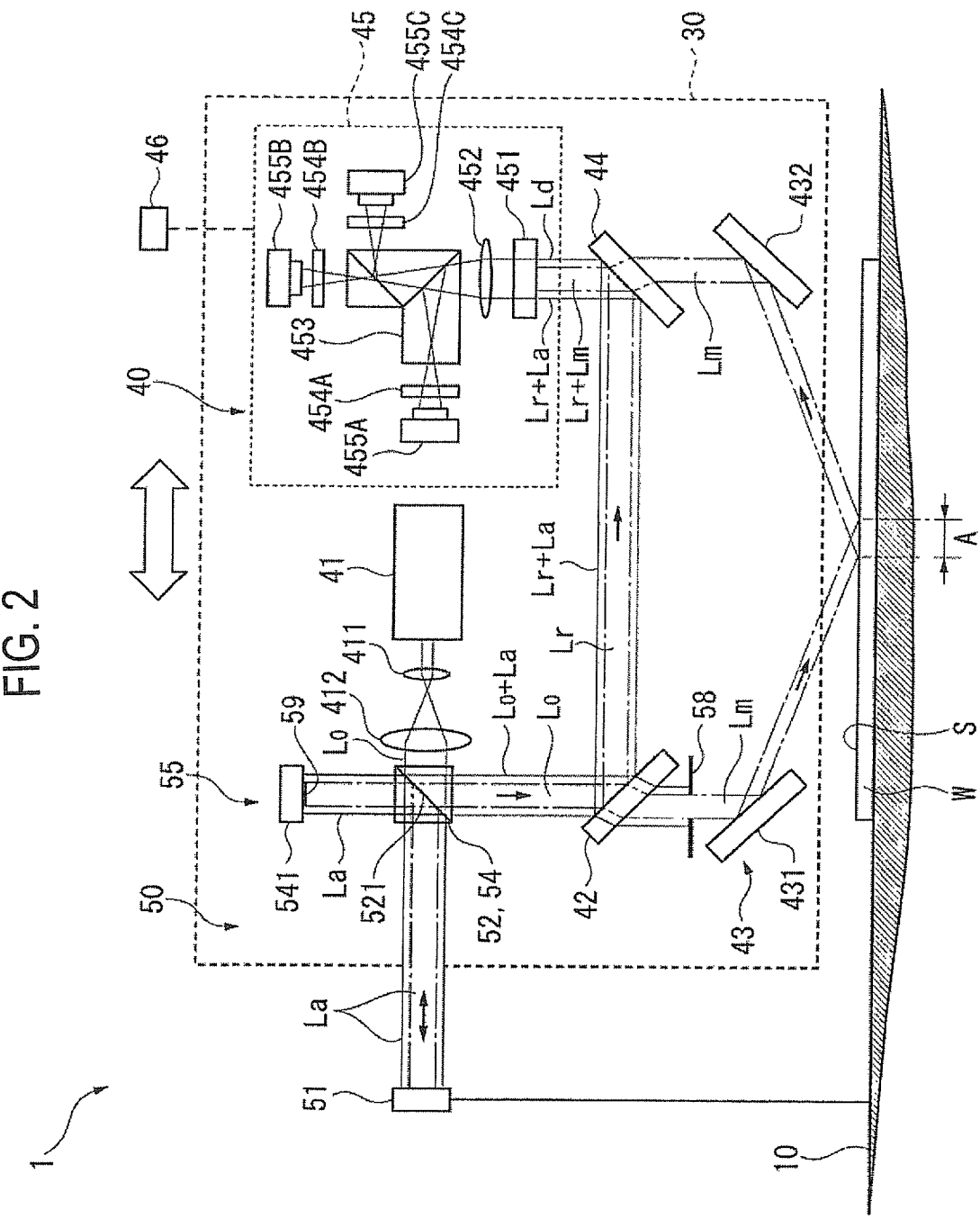
FIG. 2 is a view showing an optical element according to the first embodiment of the present invention.

In the second embodiment, a measuring optical system 40A and an auxiliary optical system 50A which are provided in the interferometer main body 30 are different from the measuring optical system 40 and the auxiliary optical system 50 shown in FIG. 2. Different components will be described below with reference to FIG. 11.

Like the measuring optical system 40 shown in FIG. 2, the measuring optical system 40A is equipped with the light source 41, the light beam divider 42, the illuminator 43, the light beam combining module 44, and the photodetector 45.

On the other hand, in the second embodiment, the measurement mask 58 shown in FIG. 2 is omitted and hence measurement light Lm having the same size as original light Lo is applied to the illuminator 43.

Furthermore, the light beam divider 42, the light beam combining module 44, and the photodetector 45 do not serve as part of the auxiliary optical system 50A.

The auxiliary optical system 50A is equipped with the auxiliary light beam separator 52 and the auxiliary reflector 51 which are the same as in the measuring optical system 40 shown in FIG. 2. On the other hand, the auxiliary mirror 541, the auxiliary mask 59, and the auxiliary light beam combining module 54 (which includes the auxiliary mirror 541 and the auxiliary mask 59) are omitted and no elements of the measuring optical system 40A serve as part of the auxiliary photodetector 55.

In the second embodiment, a half mirror 56A for interference optical path setting is disposed between the half mirror 521 of the auxiliary light beam separator 52 and the auxiliary reflector 51. And a planar photodetector 55A and a lens 57A are disposed as the auxiliary photodetector 55 in place of the auxiliary mirror 541 shown in FIG. 2.

In the above-configured second embodiment, part of original light Lo emitted from the light source 41 is reflected by the half mirror 521 of the auxiliary light beam separator 52 and divided into reference light Lr and measurement light Lm by the light beam divider 42. The measurement subject surface S of the measurement subject W is measured using the measurement light Lm. The reflected measurement light Lm is combined with the reference light Lr by the light beam combining module 44, and combined light is detected by the photodetector 45. A texture of the measurement subject surface S is detected on the basis of interference fringes of the measurement light Lm and the reference light Lr.

On the other hand, the other part of the original light Lo that passes through the half mirror 521 of the auxiliary light beam separator 52 is partly reflected by the half mirror 56A and returns to the half mirror 521 as auxiliary reference light Lar. The remaining part passes through the half mirror 56A, is reflected by the auxiliary reflector 51, and returns to the half mirror 521 as auxiliary measurement light Lam. After returning to the half mirror 521, the auxiliary reference light Lar and the auxiliary measurement light Lam pass through the lens 57A and form an image on the planar photodetector 55A. Interference fringes of the auxiliary reference light Lar and the auxiliary measurement light Lam appear in this image.

The interference fringes detected by the planar photodetector 55A reflect a relative movement between the half mirror 56A which is mounted on the interferometer main body 30 and the auxiliary reflector 51 which is mounted on the stage 10. Therefore, data of posture of the interferometer main body 30 with respect to the stage 10 can be acquired by processing the interference fringes detected by the planar photodetector 55A.

Therefore, as in the first embodiment, measurement data of a scanning measurement can be connected together correctly by using the above posture data and position outputs from the moving mechanism 20.

In the above-described second embodiment, the half mirror 521 (auxiliary light beam separator 52), the half mirror 56A, and the planar photodetector 55A and the lens 57A (auxiliary photodetector 55) are added to the measuring optical system 40A which is an interferometer basic optical system. This configuration enables acquisition of posture data of the interferometer main body 30 and sharing of the light source 41 by the measuring optical system 40A and the auxiliary optical system 50A.

Embodiment 3

Figure 12:
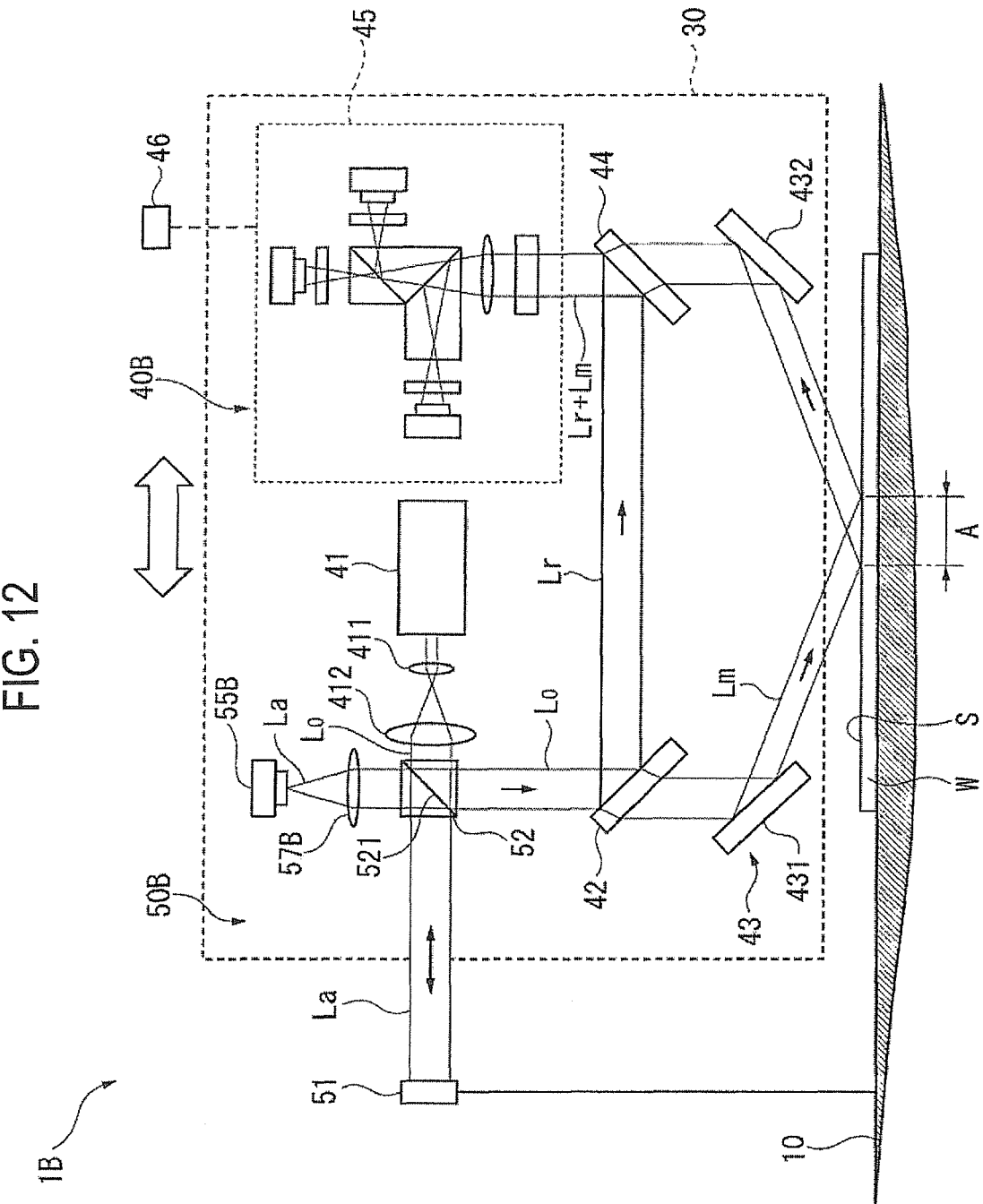
FIG. 12 is a view showing an optical element according to a third embodiment of the present invention.

FIG. 12 shows a third embodiment of the invention. As in the second embodiment, a grazing incidence interferometer 1B according to the third embodiment is obtained by modifying the measuring optical system 40 and the auxiliary optical system 50 of the grazing incidence interferometer 1 according to the first embodiment. Different components will be described below with reference to FIG. 12.

In the third embodiment, a measuring optical system 40B is the same as the measuring optical system 40A used in the second embodiment. The measurement mask 58 is omitted from the measuring optical system 40 shown in FIG. 2 and hence measurement light Lm having the same size as original light Lo is applied to the illuminator 43.

Furthermore, the light beam divider 42, the light beam combining module 44, and the photodetector 45 do not serve as part of the auxiliary optical system 50B.

The auxiliary optical system 50B is similar to the auxiliary optical system 50A used in the second embodiment and is different from the latter in that the half mirror 56A is omitted and a planar photodetector 55B is disposed at the focal position of a lens 57B.

Since the auxiliary optical system 50B is not equipped with the half mirror 56A, no interference fringes are detected by the planar photodetector 55B. On the other hand, a light beam returning from the auxiliary reflector 51 is focused on the planar photodetector 55B and the focusing position on the planar photodetector 55B indicates a posture change of the interferometer main body 30 with respect to the stage 10.

Therefore, as in the first embodiment, measurement data of a scanning measurement can be connected together correctly by using the above posture data and position outputs from the moving mechanism 20.

In the above-described third embodiment, the half mirror 521 (auxiliary light beam separator 52) and the planar photodetector 55B and the lens 57B (auxiliary photodetector 55) are added to the measuring optical system 40B which is an interferometer basic optical system. This configuration enables acquisition of posture data of the interferometer main body 30 with respect to the stage 10 and sharing of the light source 41 by the measuring optical system 40B and the auxiliary optical system 50B.

Modifications Etc.

The invention is not limited to the above embodiments and encompasses modifications that do not depart from the spirit and scope of the invention.

For example, the details of the stage 10, the moving mechanism 20, and the interferometer main body 30 and the configurations and the elements of each of the measuring optical systems 40, 40A, and 40B may be different from those described above.

Each of the auxiliary optical systems 50, 50A, and 50B may be configured in a different manner as long as the same functions can be obtained. And the arrangement etc. of the elements of each of the auxiliary optical systems 50, 50A, and 50B may be determined as appropriate.

What is claimed is:

1. A grazing incidence interferometer comprising:
an interferometer main body having
a light source configured to generate coherent original light,
a light beam divider configured to divide the original light coming from the light source into measurement light and reference light,
an illuminator configured to apply the measurement light obliquely to a measurement subject surface of a measurement subject,
a light beam combining module configured to combine the measurement light reflected from the measurement subject surface with the reference light, and
a photodetector configure to detect a combined light beam produced by the light beam combining module;
a stage configured to hold the measurement subject;
a moving mechanism mounted on the stage, and configured to support the interferometer main body and to be capable of moving the interferometer main body along the measurement subject; and
an auxiliary reflector fixed to the stage and disposed on an extension of an axis of movement of the interferometer main body by the moving mechanism,
wherein the interferometer main body has
an auxiliary light beam separator configured to separate auxiliary light from the original light coming from the light source and to apply the separated auxiliary light to the auxiliary reflector, and
an auxiliary photodetector configured to detect the auxiliary light reflected by the auxiliary reflector, wherein the auxiliary photodetector comprises a half mirror so as to be located on an optical path between the auxiliary light beam separator and the auxiliary reflector, and a planar photodetector configured to detect a combined light beam of auxiliary light coming from the auxiliary reflector and light reflected from the half mirror.

2. The grazing incidence interferometer according to claim 1, wherein the auxiliary photodetector comprises a lens configured to focus the auxiliary light coming from the auxiliary reflector and the planar photodetector is disposed at a focal position of the lens.

3. A grazing incidence interferometer comprising:
an interferometer main body having
a light source configured to generate coherent original light,
a light beam divider configured to divide the original light coming from the light source into measurement light and reference light,
an illuminator configured to apply the measurement light obliquely to a measurement subject surface of a measurement subject,
a light beam combining module configured to combine the measurement light reflected from the measurement subject surface with the reference light, and
a photodetector configure to detect a combined light beam produced by the light beam combining module;
a stage configured to hold the measurement subject;
a moving mechanism mounted on the stage, and configured to support the interferometer main body and to be capable of moving the interferometer main body along the measurement subject; and
an auxiliary reflector fixed to the stage and disposed on an extension of an axis of movement of the interferometer main body by the moving mechanism,
wherein the interferometer main body has
an auxiliary light beam separator configured to separate auxiliary light from the original light coming from the light source and to apply the separated auxiliary light to the auxiliary reflector, and
an auxiliary photodetector configured to detect the auxiliary light reflected by the auxiliary reflector, wherein the auxiliary photodetector comprises an auxiliary light beam combining module configured to combine the auxiliary light coming from the auxiliary reflector and the original light coming from the light source and to supply a combined light beam to the light beam divider, and an auxiliary mask disposed on an optical path of the auxiliary light that goes from the auxiliary light beam separator to the auxiliary light beam combining module past the auxiliary reflector and configured to transmit only part, located in an auxiliary light region, of the auxiliary light,
one of the light beam divider, the illuminator, and the light beam combining module has a measurement mask disposed in an optical path of the measurement light and configured to transmit only part, located in a prescribed measurement light region, of the measurement light, and the auxiliary light region of the auxiliary mask and the measurement light region of the measurement mask are set so as not to overlap with each other.

4. The grazing incidence interferometer according to claim 3, wherein the measurement light region is an inside region of a beam of the measurement light and the auxiliary light region is a ring-shaped region located outside the measurement light region.

5. The grazing incidence interferometer according to claim 1, wherein the light beam divider, the light beam combining module, and the photodetector all serve as part of the auxiliary photodetector.

* * * * *